(12) United States Patent
Zelina et al.

(10) Patent No.: US 12,516,818 B2
(45) Date of Patent: Jan. 6, 2026

(54) MULTI-FUEL COMBUSTION SYSTEM

(71) Applicant: General Electric Company, Schenectady, NY (US)

(72) Inventors: Joseph Zelina, Waynesville, OH (US); Hiranya Kumar Nath, Bangalore (IN); Sibtosh Pal, Mason, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 45 days.

(21) Appl. No.: 18/441,297

(22) Filed: Feb. 14, 2024

(65) Prior Publication Data

US 2025/0257875 A1    Aug. 14, 2025

(51) Int. Cl.
*F23R 3/38* (2006.01)
*F23R 3/34* (2006.01)
*F23R 3/36* (2006.01)

(52) U.S. Cl.
CPC ............... *F23R 3/36* (2013.01); *F23R 3/346* (2013.01); *F23R 3/38* (2013.01)

(58) Field of Classification Search
CPC .... F23R 3/38; F23R 3/34; F23R 3/346; F23R 3/36
See application file for complete search history.

(56) References Cited

U.S. PATENT DOCUMENTS

| | | | |
|---|---|---|---|
| 3,975,900 A | 8/1976 | Pfefferle | |
| 5,003,766 A * | 4/1991 | Paul | F02C 6/003 60/39.15 |
| 5,265,425 A | 11/1993 | Howell | |
| 5,490,380 A * | 2/1996 | Marshall | F23R 3/50 60/776 |
| 7,937,946 B1 * | 5/2011 | Harris | F02C 7/224 60/39.08 |
| 8,272,219 B1 | 9/2012 | Johnson et al. | |
| 8,479,492 B2 | 7/2013 | Patel et al. | |
| 8,549,862 B2 | 10/2013 | Kendrick | |
| 10,941,940 B2 | 3/2021 | Bulat et al. | |
| 10,976,053 B2 | 4/2021 | Boardman et al. | |
| 11,073,286 B2 | 7/2021 | Boardman et al. | |
| 11,371,710 B2 | 6/2022 | Bulat | |
| 2010/0212325 A1 * | 8/2010 | Condevaux | F23R 3/16 60/740 |

(Continued)

FOREIGN PATENT DOCUMENTS

| | | |
|---|---|---|
| EP | 3217097 A1 | 9/2017 |
| EP | 3450850 A1 | 3/2019 |

OTHER PUBLICATIONS

Extended Search Report for EP Application No. 25153950.8, dated Apr. 28, 2025, 9 pages.

*Primary Examiner* — Gerald L Sung
(74) *Attorney, Agent, or Firm* — Carter, DeLuca & Farrell LLP

(57) ABSTRACT

A multi-fuel combustion system for a turbine engine, the multi-fuel combustion system having a combustion chamber formed by a combustor liner. The combustion chamber defines a first combustion zone and a second combustion zone. A first fuel system is fluidly coupled with the first combustion zone, where a rotary fuel slinger provides a first fuel to the first combustion zone. A second fuel system is fluidly coupled with the second combustion zone, where a gaseous fuel injector provides a second fuel to the second combustion zone.

18 Claims, 6 Drawing Sheets

(56) References Cited

U.S. PATENT DOCUMENTS

| | | | |
|---|---|---|---|
| 2011/0219779 A1 | 9/2011 | Critchley et al. | |
| 2012/0240588 A1* | 9/2012 | Patel | F02C 9/26 |
| | | | 60/745 |
| 2018/0003388 A1* | 1/2018 | Park | F23R 3/04 |
| 2023/0340915 A1* | 10/2023 | Speak | F02C 3/24 |
| 2024/0053015 A1* | 2/2024 | Clemen | F23R 3/286 |

* cited by examiner

MULTI-FUEL COMBUSTION SYSTEM

TECHNICAL FIELD

The present subject matter relates generally to a turbine engine having a multi-fuel combustion system.

BACKGROUND

Turbine engines are driven by a flow of combustion gases passing through the engine to rotate a multitude of turbine blades, which, in turn, rotate a compressor to provide compressed air to the combustor for combustion. A combustor can be provided within the turbine engine and is fluidly coupled with a turbine into which the combusted gases flow.

Historically, fuels are used in the combustor of a turbine engine. Generally, air and fuel are fed to a combustion chamber, the air and fuel are mixed, and then the fuel is burned in the presence of the air to produce hot gas. The hot gas is then fed to a turbine to produce power.

DETAILED DESCRIPTION

Figure 1:
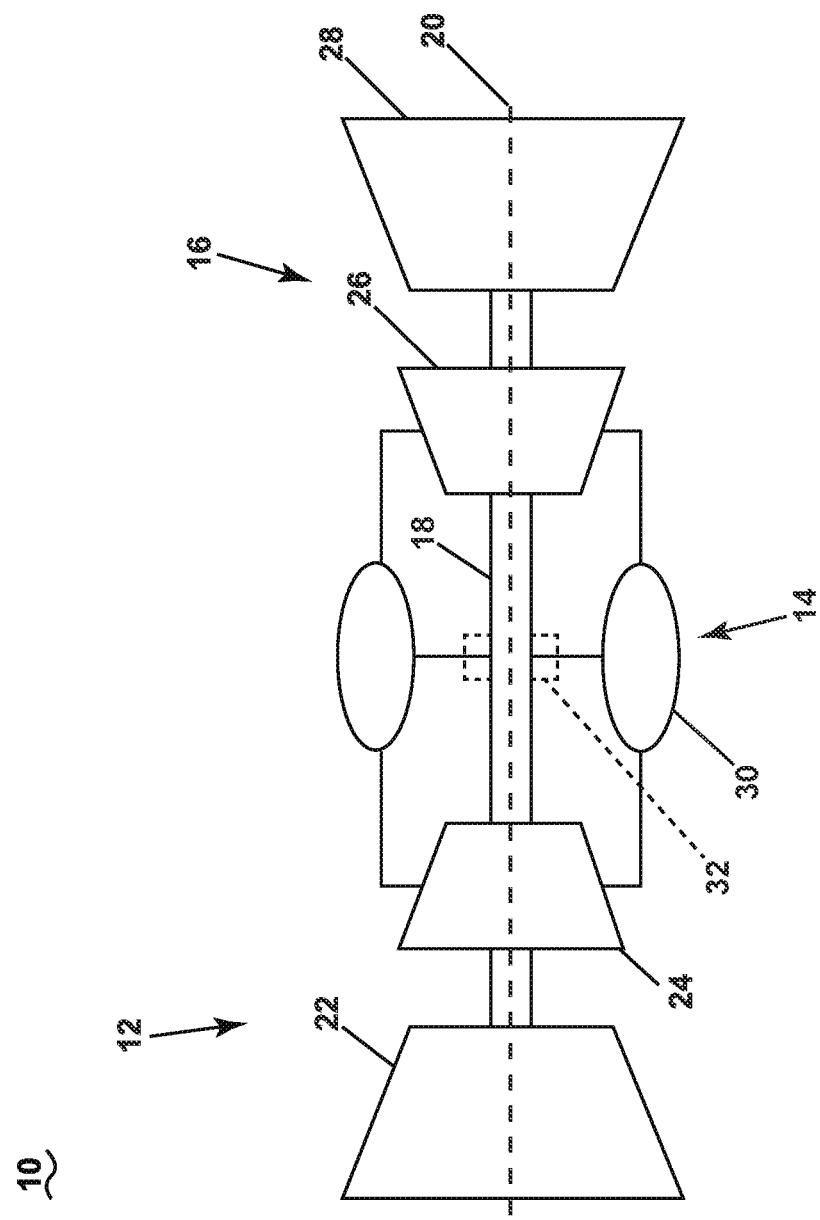
FIG. 1 is a schematic cross-sectional view of a turbine engine having a compressor section, a combustion section with a multi-fuel combustion system, and a turbine section in accordance with various aspects described herein.

Aspects of the disclosure described herein are directed to a multi-fuel combustion system. The multi-fuel combustion system includes a combustion chamber defined, in part, by a combustor liner. The combustor liner can have a forward liner and an aft liner. The forward liner at least partially defines a first combustion zone and the aft liner at least partially defines a second combustion zone within the combustion chamber.

A first fuel system includes a rotary fuel slinger which provides a first fuel to the first combustion zone. The rotary fuel slinger is rotationally driven and can atomize the first fuel received by rapid spinning and spraying of the first fuel. That is, the first fuel can be centrifuged radially outward within a portion of the rotary fuel slinger and another portion of the rotary fuel slinger can receive and discharge the first fuel as a collection of droplets.

The exhaust from the first combustion zone enters the second combustion zone. That is, the second combustion zone is fluidly downstream of the first combustion zone. The second combustion zone is provided with a second fuel from a gaseous fuel injector of a second fuel system. The second fuel burns faster, hotter, cleaner or any combination thereof when compared to the first fuel. Burning the exhaust from the first combustion zone in the second combustion zone reduces total emissions from the combustion chamber.

For purposes of illustration, the present disclosure will be described with respect to a turbine engine. It will be understood, however, that aspects of the disclosure described herein are not so limited and that a combustor as described herein can be implemented in engines, including but not limited to turbojet, turboprop, turboshaft, and turbofan engines. Aspects of the disclosure discussed herein may have general applicability within non-aircraft engines having a combustor, such as other mobile applications and non-mobile industrial, commercial, and residential applications.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As may be used herein, the terms "first" and "second" may be used interchangeably to distinguish one component from another and are not intended to signify location or importance of the individual components.

The terms "forward" and "aft" refer to relative positions within a turbine engine or a vehicle, and refer to the normal operational attitude of the turbine engine or vehicle. For example, with regard to a turbine engine, forward refers to a position closer to an engine inlet and aft refers to a position closer to an engine exhaust.

As used herein, the term "upstream" refers to a direction that is opposite the fluid flow direction, and the term "downstream" refers to a direction that is in the same direction as the fluid flow.

The term "fluid" may be a gas or a liquid, or a combination thereof. The term "fluidly coupled" means that a fluid is capable of making the connection between the areas specified. The term "fluidly exposed" means that one or more portions of an object is contacted by a fluid.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, upper, lower, left, right, front, back, top, bottom, above, below, vertical, horizontal, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, and connected) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only. The dimensions, positions, order, and relative sizes reflected in the drawings attached hereto can vary.

The term "perpendicular" refers to generally perpendicular, where the angle between a first line and a second line is in a range of 85° to 95°. The term "parallel" refers to generally parallel, where first and second lines extend such that a third line can be drawn that crosses the first and second line, wherein the third line in a range of 85° to 95° to both the first line and the second line.

The singular forms "a", "an", and "the" include plural references unless the context clearly dictates otherwise. Furthermore, as used herein, the term "set" or a "set" of elements can be any number of elements, including only one.

Uses of "and" and "or" are to be construed broadly. For example, and without limitation, uses of "and" do not necessarily require all elements or features listed, and uses of "or" are inclusive unless such a construction would be illogical.

As used herein, a "controller", for example, "control module", "regulator module", "integrator module" can include a component configured or adapted to provide instruction, control, operation, or any form of communication for operable components to affect the operation thereof. Such controllers or modules can include any known processor, microcontroller, or logic device, including, but not limited to: Field Programmable Gate Arrays (FPGA), a Complex Programmable Logic Device (CPLD), an Application-Specific Integrated Circuit (ASIC), a Full Authority Digital Engine Control (FADEC), a Proportional Controller (P), a Proportional Integral Controller (PI), a Proportional Derivative Controller (PD), a Proportional Integral Derivative Controller (PID), a hardware-accelerated logic controller (e.g. for encoding, decoding, transcoding, etc.), the like, or a combination thereof. While described herein as comprising separate elements, in non-limiting aspects such controllers and modules can be incorporated on one or more devices including a common device, such as a single processor or microcontroller. Non-limiting examples of such controllers or module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller, a controller module, regulator module, or integrator module can also include a data storage component accessible by the processor, including memory, whether transition, volatile or non-transient, or non-volatile memory. Additional non-limiting examples of the memory can include Random Access Memory (RAM), Read-Only Memory (ROM), flash memory, or one or more different types of portable electronic memory, such as discs, DVDs, CD-ROMs, flash drives, Universal Serial Bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to effect a functional or operable outcome, as described herein. In another non-limiting example, a controller can compare a first value with a second value, and operating or controlling operations of additional components based on the satisfying of that comparison. For example, when a sensed, measured, or provided value is compared with another value, including a stored or predetermined value, the satisfaction of that comparison can result in actions, functions, or operations controllable by the controller. As used, the term "satisfies" or "satisfaction" of the comparison is used herein to mean that the first value satisfies the second value, such as being equal to or less than the second value, or being within the value range of the second value. It will be understood that such a determination may easily be altered to be satisfied by a positive/negative comparison or a true/false comparison. Example comparisons can include comparing a sensed or measured value to a threshold value or threshold value range.

Also, as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller or processor, and the controller or processor can perform processing on the value to determine a representative value or an electrical characteristic representative of said value.

FIG. 1 is a schematic view of a turbine engine 10. As a non-limiting example, the turbine engine 10 can be used with an aircraft. The turbine engine 10 can include, at least, a compressor section 12, a combustion section 14, and a turbine section 16 in a serial flow arrangement. A drive shaft 18 rotationally couples the compressor section 12 and turbine section 16, such that rotation of one affects the rotation of the other, and defines an engine centerline 20 for the turbine engine 10.

The compressor section 12 can include a low-pressure (LP) compressor 22, and a high-pressure (HP) compressor 24 serially fluidly coupled to one another. The turbine section 16 can include an HP turbine 26 and an LP turbine 28 serially fluidly coupled to one another. The drive shaft 18 can operatively couple the LP compressor 22, the HP compressor 24, the HP turbine 26 and the LP turbine 28 together. Alternatively, the drive shaft 18 can include an LP drive shaft and an HP drive shaft. The LP drive shaft can couple the LP compressor 22 to the LP turbine 28, and the HP drive shaft can couple the HP compressor 24 to the HP turbine 26. An LP spool can be defined as the combination of the LP compressor 22, the LP turbine 28, and the LP drive shaft such that the rotation of the LP turbine 28 can apply a driving force to the LP drive shaft, which in turn can rotate the LP compressor 22. An HP spool can be defined as the combination of the HP compressor 24, the HP turbine 26, and the HP drive shaft such that the rotation of the HP turbine 26 can apply a driving force to the HP drive shaft which in turn can rotate the HP compressor 24.

The compressor section 12 can include a plurality of axially spaced stages. Each stage includes a set of circumferentially-spaced rotating blades and a set of circumferentially-spaced stationary vanes. The compressor blades for a stage of the compressor section 12 can be mounted to a disk, which is mounted to the drive shaft 18. Each set of blades for a given stage can have its own disk. The vanes of the compressor section 12 can be mounted to a casing which can extend circumferentially about the turbine engine 10. It will be appreciated that the representation of the compressor section 12 is merely schematic and that there can be any number of blades, vanes, and stages. Further, it is contemplated that there can be any number of other components within the compressor section 12.

Similar to the compressor section 12, the turbine section 16 can include a plurality of axially spaced stages, with each stage having a set of circumferentially-spaced, rotating blades and a set of circumferentially-spaced, stationary vanes. The turbine blades for a stage of the turbine section 16 can be mounted to a disk which is mounted to the drive shaft 18. Each set of blades for a given stage can have its own disk. The vanes of the turbine section can be mounted to a casing in a circumferential manner. It is noted that there can be any number of blades, vanes, and turbine stages, as the illustrated turbine section is merely a schematic representation. Further, it is contemplated that there can be any number of other components within the turbine section 16.

The combustion section 14 can be provided serially between the compressor section 12 and the turbine section 16. The combustion section 14 can be fluidly coupled to at least a portion of the compressor section 12 and the turbine section 16 such that the combustion section 14 at least partially fluidly couples the compressor section 12 to the turbine section 16. As a non-limiting example, the combustion section 14 can be fluidly coupled to the HP compressor 24 at an upstream end of the combustion section 14 and to the HP turbine 26 at a downstream end of the combustion section 14.

A slinger multi-fuel combustion system or a multi-fuel combustion system 30 is included in the combustion section 14. The multi-fuel combustion system 30 can receive a rotatable output from the drive shaft 18. That is, a portion of the multi-fuel combustion system 30 is rotatably coupled to the drive shaft 18 which illustrates, by way of example, the LP drive shaft, the HP drive shaft, or both. The multi-fuel combustion system 30 can be fluidly coupled to a portion of the drive shaft 18 to receive a liquid fuel.

Additionally, or alternatively, an engagement assembly 32 can selectively fluidly connect or disconnected the multi-fuel combustion system 30 from a fuel source. By way of non-limiting example, the fuel source can be liquid fuel, hydrogen fuel, gaseous fuel, or any combination thereof. In other words, the liquid fuel can be "turned off" or disconnected by the engagement assembly 32, while the engagement assembly 32 can be providing hydrogen fuel or other gaseous fuels, or vice versa.

During operation of the turbine engine 10, ambient or atmospheric air is drawn into the compressor section 12 via a fan upstream of the compressor section 12, where the air is compressed, defining a pressurized air. The pressurized air can then flow into the combustion section 14 where the pressurized air is mixed with fuel and ignited, thereby generating combustion gases. Some work is extracted from these combustion gases by the HP turbine 26, which drives the HP compressor 24. The combustion gases are discharged into the LP turbine 28, which extracts additional work to drive the LP compressor 22, and the exhaust gas is ultimately discharged from the turbine engine 10 via an exhaust section downstream of the turbine section 16. The driving of the LP turbine 28 drives the LP spool to rotate the fan and the LP compressor 22.

One or more components of the turbine engine 10, such as, but not limited to, an engine starter or one or more portions of the turbine section 16, provide rotational energy to the drive shaft 18. The drive shaft 18 can provide a rotatable output to a portion of the multi-fuel combustion system 30 as further discussed in FIG. 2.

Figure 2:
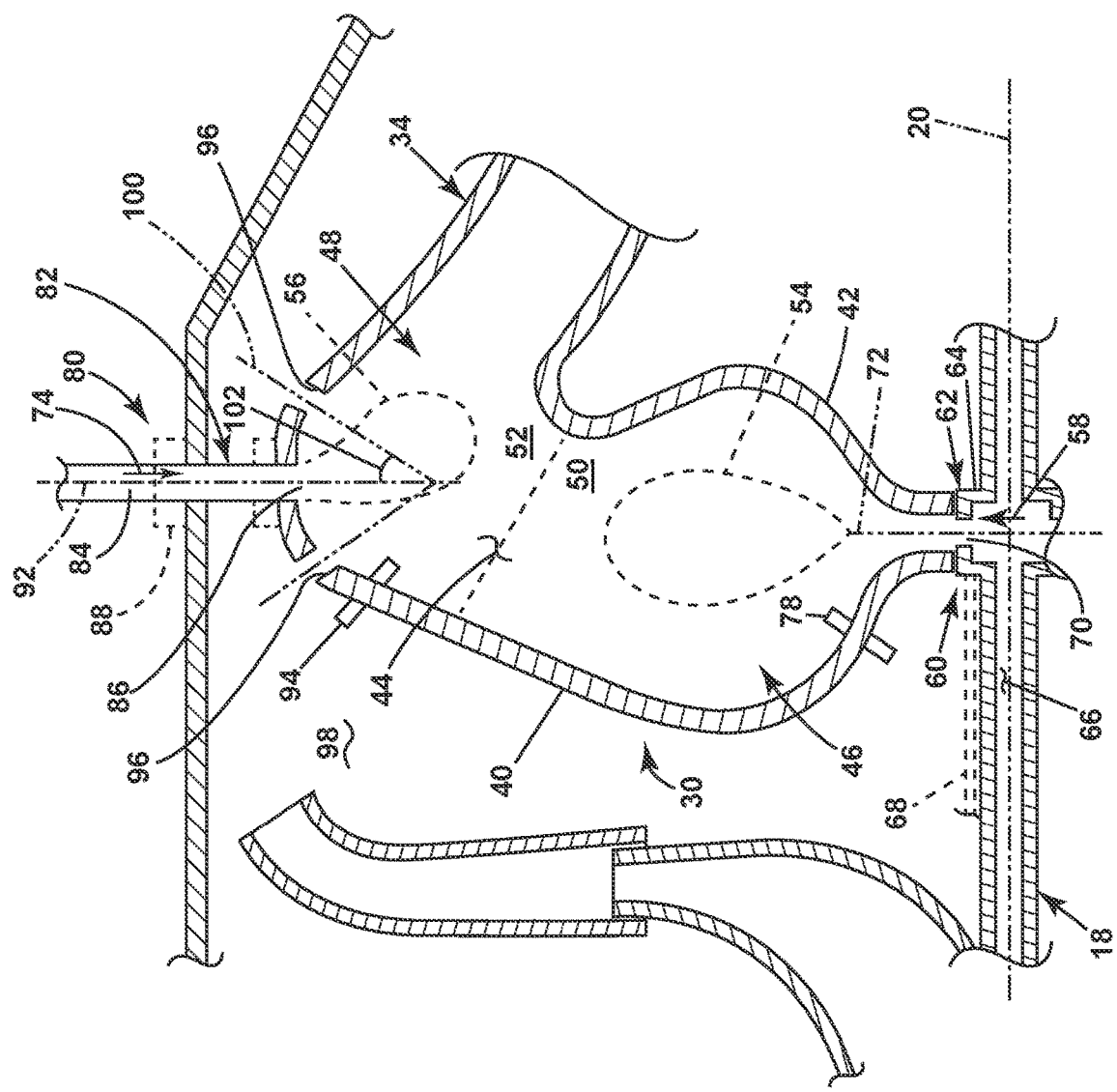
FIG. 2 is a schematic cross-sectional view the multi-fuel combustion system of FIG. 1 in accordance with various aspects described herein.

FIG. 2 is a schematic cross-sectional view of the multi-fuel combustion system 30. The multi-fuel combustion system 30 includes a combustor liner 34 with a forward liner 40 and an aft liner 42, spaced axially from the forward liner 40. A combustion chamber 44 can be formed by the combustor liner 34. The combustion chamber 44 can be an annular chamber. Alternately, in another non-limiting example, the combustion chamber 44 can be a plurality of circumferentially spaced combustion chambers.

The combustion chamber 44 includes a radially-extending portion 46 and an axially-extending portion 48. The radially-extending portion 46 can include a first combustion zone 50. The axially-extending portion 48 can include a second combustion zone 52. In other words, the combustion chamber 44 includes at least two combustion zones, the first combustion zone 50 and the second combustion zone 52, separated, by way of example, by a dotted line. It should be understood that the dotted line can be curved and located anywhere in the combustion chamber 44 that separates the combustion chamber 44 into two combustion zones. As used herein, a combustion zone includes a non-luminous zone where air and fuel are mixed to produce combustion. A first flame can be located in a first region 54 within the first combustion zone 50. A second flame can be located in a second region 56 within the second combustion zone 52.

A first fuel system 60 is fluidly coupled to the first combustion zone 50. The first fuel system 60 includes a liquid fuel injector or nozzle having a slinger, illustrated as a rotary fuel slinger 62, for providing a first fuel 58 to the first combustion zone 50.

The rotary fuel slinger 62 is operably coupled to the drive shaft 18. That is, as the drive shaft 18 rotates, a rotor portion 64 of the rotary fuel slinger 62 can rotate. While illustrated as permanently coupled or formed with the drive shaft 18, it is contemplated in a different and non-limiting example that the rotary fuel slinger 62 can be selectively operably coupled to the drive shaft 18.

The first fuel system 60 can include a fuel passage 66. As illustrated, by way of example, the fuel passage 66 can be defined by the drive shaft 18. Additionally, or alternatively, a first conduit 68, illustrated in dashed line, can provide the first fuel 58 to the rotary fuel slinger 62, where the first conduit 68 is located axially along and radially outward of the drive shaft 18. The first conduit 68 can be coupled to the first fuel system 60 via the engagement assembly 32 (FIG. 1).

A first fuel outlet, illustrated as an outlet 70, of the rotary fuel slinger 62 emits the first fuel 58 into the radially-extending portion 46 or the first combustion zone 50 of the combustion chamber 44. A slinger injector centerline 72 can be defined by the outlet 70. The slinger injector centerline 72 can be perpendicular to the engine centerline 20. That is, slinger injector centerline 72 can form an angle with the engine centerline 20 in a range from 85° to 95°. Alternatively, the slinger injector centerline 72 can form an angle with the engine centerline 20 in a range from 20° to less than 85°.

A first ignitor 78 can be located in the first combustion zone 50. The first ignitor 78 is illustrated, by way of example, as located in the forward liner 40. Additionally, or alternatively, the first ignitor 78 for the first fuel in the first combustion zone 50 can be located at the aft liner 42. While the first ignitor 78 is illustrated as a single ignitor, multiple igniters are contemplated.

A second fuel system 80 is fluidly coupled to the second combustion zone 52. The second fuel system 80 includes a fuel injector illustrated as a gaseous fuel injector 82 and a fuel supply passage illustrated as a gaseous fuel supply passage 84 terminating in an outlet illustrated as a gaseous fuel injector outlet 86. The gaseous fuel injector 82 provides a second fuel 74 to the second combustion zone 52. The second fuel can be provided to the gaseous fuel injector 82 by the gaseous fuel supply passage 84. That is, the gaseous fuel supply passage 84 is fluidly coupled to the gaseous fuel injector 82.

While illustrated as a single gaseous fuel injector, the gaseous fuel injector 82 can be a set of circumferentially spaced gaseous fuel injectors. The set of circumferentially spaced gaseous fuel injectors can be circumferentially spaced about the engine centerline 20.

Optionally, a valve 88 can control the flow of the second fuel 74 into the gaseous fuel injector 82 from the gaseous fuel supply passage 84. The valve 88 can be located at or upstream of the intersection of the gaseous fuel supply passage 84 and the gaseous fuel injector 82.

A gaseous fuel injector centerline 92 can be defined by the gaseous fuel injector outlet 86. The gaseous fuel injector centerline 92 can be perpendicular to the engine centerline 20. Alternatively, the gaseous fuel injector centerline 92 can form an angle with the engine centerline 20 in a range from 20° to less than 85°, as further illustrated in FIGS. 5-6.

A second ignitor 94 can be located in the second combustion zone 52. The second ignitor 94 is located, by way of example, at the forward liner 40. Additionally, or alternatively, the second ignitor 94 for the second fuel in the second combustion zone 52 can be located at the aft liner 42. While the second ignitor 94 is illustrated as a single ignitor, multiple igniters are contemplated. It is further contemplated that the first ignitor 78 and the second ignitor 94 can be a single ignitor. That is, the combustion chamber 44 includes at least one ignitor, illustrated, by way of example as the first ignitor 78 and the second ignitor 94.

A set of dilution holes 96 can be provided in the combustor liner 34. The set of dilution holes 96 are located in the second combustion zone 52 and are configured to direct air from an exterior 98 of the combustion chamber 44 into the second combustion zone 52. The set of dilution holes 96 can be adjacent the gaseous fuel injector outlet 86 for temperature control, flame shaping, fuel-air mixing, or the like. That is, the set of dilution holes 96 can be circumferentially spaced about the gaseous fuel injector outlet 86. Any number of dilution holes can be provided in the set of dilution holes 96. The set of dilution holes 96 can have any suitable patterning or arrangement including linear rows, irregular groups, variable hole diameters, or the like, or combinations thereof.

As used herein, the term "adjacent" means within an axial distance that is six times the diameter of the gaseous fuel injector outlet 86 or less. That is, the axial distance from the gaseous fuel injector outlet 86 to at least one or more of the set of dilution holes 96 is equal to or less than 600% of the diameter of the gaseous fuel injector outlet 86. The set of dilution holes 96 are closer to the gaseous fuel injector outlet 86 than dilution holes of a traditional fuel outlet that would provide traditional liquid fuels to a combustion chamber. The set of dilution holes 96 are closer to the gaseous fuel injector outlet 86, as the reactions with the second fuel 74 will happen much faster than traditional fuels.

A dilution hole centerline 100 can be defined by each dilution hole of the set of dilution holes 96. An angle 102 defined as the intersection of the dilution hole centerline 100 and the gaseous fuel injector centerline 92 can be in a range of greater than 0° and less than 90°.

The dilution hole centerline 100 can be parallel to the slinger injector centerline 72. Alternatively, an angle between the slinger injector centerline 72 and the dilution hole centerline 100 is non-zero. Optionally, the gaseous fuel injector outlet 86 can be axially aft of the rotary fuel slinger 62 or the slinger injector centerline 72. Alternatively, in different and non-limiting examples, a portion of the gaseous fuel injector outlet 86 can be axially forward or axially align with at least a portion of the rotary fuel slinger 62 or the slinger injector centerline 72.

Figure 3:
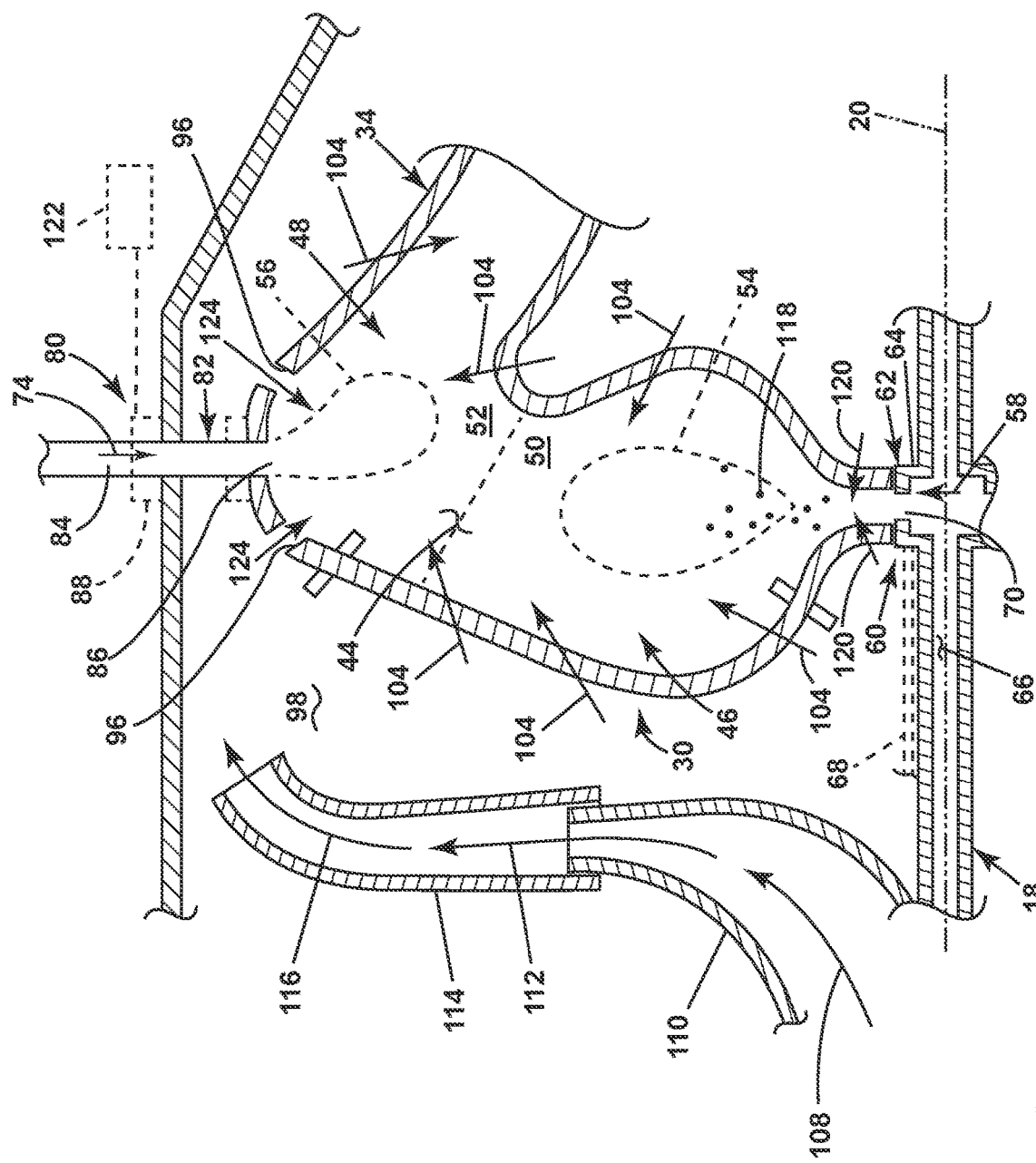
FIG. 3 is the schematic cross-sectional view the multi-fuel combustion system of FIG. 2 further illustrating fuel and air flows in accordance with various aspects described herein.

FIG. 3 further illustrates the multi-fuel combustion system 30 during one or more portions of a cycle of operation of the turbine engine 10 (FIG. 1). The cycle of operation can include, but is not limited to, start-up, idle, take-off, cruise, decent or land, and shut-down. Referring to FIG. 1, during start-up the turbine engine 10 is provided with mechanical energy to begin the rotation of the drive shaft 18 and one or more portions of the compressor section 12 or the turbine section 16. Once started, air is channeled into the LP compressor 22, which then supplies pressurized airflow to the HP compressor 24, which further pressurizes the air.

Referring again to FIG. 3, a portion of the pressurized airflow from the HP compressor 24 (FIG. 1) is mixed with the first fuel 58, the second fuel 74, or both in the multi-fuel combustion system 30 and ignited, thereby generating combustion gases. Some work can be extracted from these gases by the HP turbine 26 (FIG. 1), which drives the HP compressor 24 (FIG. 1). The combustion gases are discharged into the LP turbine 28 (FIG. 1), which can extract additional work to drive the LP compressor 22 (FIG. 1).

More specifically, the fuel passage 66, the first conduit 68, or a combination of both provides the first fuel 58 to the rotor portion 64 of the rotary fuel slinger 62. The first fuel 58 can be a liquid fuel that includes, for example, kerosene or petroleum. The first fuel 58 has a residence time in the combustion chamber 44 in a range from 3 milliseconds to 7 milliseconds. By way of non-limiting example, the first fuel 58 can have a residence time in a range from 3 milliseconds to 5 milliseconds. Residence time can be calculated for the first fuel 58 in the first combustion zone 50 or in the first combustion zone 50 and at least a portion of the second combustion zone 52. Residence time can be estimated by dividing the volume of the combustion chamber or zone by the volumetric flow rate of the fuel stream. In other words, the residence time is the time needed in a combustion chamber or zone to evaporate fuel (as needed), mix fuel and air, and burn or otherwise complete the chemical reactions of the fuel-air mixture. The estimate can further be refined by including swirl of the fuel-air mixture.

The outlet 70 of the rotary fuel slinger 62 emits the first fuel 58 as an atomized liquid fuel 118 into the radially-extending portion 46 or the first combustion zone 50 of the combustion chamber 44. The first fuel 58 is atomized using centrifugal force from the drive shaft 18. In other words, because of the rotating rotor portion 64, the first fuel 58 moves radially outward towards the outlet 70 due to the inertia of the first fuel 58 within the rotating drive shaft 18 and the rotor portion 64. The first fuel 58 exits the outlet 70 as tiny droplets. The first fuel 58 experiences pressure as it moves towards the outlet 70 within the rotor portion 64, causing pressure atomization of the first fuel 58. The pressure atomization of the first fuel 58 provides an even distribution of the first fuel 58 into the first combustion zone 50.

Optionally, an atomizing air flow 120 can be provided and oriented to shear the first fuel 58 as it passes through the outlet 70 and into the first combustion zone 50. The atomizing air flow 120 can atomize the first fuel 58 in addition to the pressure atomization provided by the rotor portion 64 to provide the atomized liquid fuel 118 to the first combustion zone 50.

Independent or concurrent with the flow of the first fuel 58 to the rotary fuel slinger 62, the second fuel 74 can be provided to the gaseous fuel injector 82 via the gaseous fuel supply passage 84. The flow of the second fuel 74 can be controlled by a controller 122 in communication with, for example, the valve 88. It is also contemplated that the flow of the first fuel 58 can be controlled by the controller 122 or another controller or device.

The second fuel 74 can be a gaseous fuel including a hydrocarbon fuel, hydrogen fuel, or a mixture of differing fuel types. The second fuel 74 has a residence time in the combustion chamber 44 in a range from 0.2 milliseconds to 4 milliseconds. By way of non-limiting example, the second fuel 74 in the second combustions zone 52 can have a residence time in a range from 1 millisecond to 3 milliseconds. The residence time for the second fuel 74 can be calculated for the in the second combustion zone 52 or in the second combustion zone 52 and at least a portion of the first combustion zone 50.

Optionally, the gaseous fuel injector 82 can include one or more of a swirler, an air inlet, multiple fuel injectors, a premixer vortex generator, or other fuel-air mixing devices arranged in discrete clusters or groups such that the fuel-air mixture has a non-zero swirl at the gaseous fuel injector outlet 86.

The second fuel 74 or a mixture of air and the second fuel 74 can exit the gaseous fuel injector 82 at the gaseous fuel injector outlet 86. The second fuel 74, that includes hydrogen, can burn faster or hotter than traditional fuels such as, for example, the first fuel 58. The set of dilution holes 96 can provide an air flow 124 that, for example, provide temperature control, flame shaping, and fuel-air mixing in the second combustion zone 52. The set of dilution holes 96 can provide cooling for the combustor liner 34, however, the primary benefit of the air flow 124 adjacent the gaseous fuel injector outlet 86 is to control the temperature, provide flame shaping, and fuel-air mixing for the flame or combustion in the second region 56.

Additional dilution holes can provide air flow 104, indicated by arrows, which direct air from the exterior 98 of the combustion chamber 44 to the first combustion zone 50, the second combustion zone 52, or both. The additional dilution holes can provide temperature control, flame shaping for one or both of the first region 54 or the second region 56, fuel-air mixing, or the like.

Compressed air for the set of dilution holes 96, the additional dilution holes, the air flow 124, or other film holes that extend through the combustor liner 34 can come from the compressor section 12 (FIG. 1). The compressor section 12 (FIG. 1) provides a compressed air flow 108, illustrated as an arrow, to an air passage compressor 110, which can further compress the air flow. That is, the compressed air flow 108 flows through the air passage compressor 110 where it becomes a further compressed airflow 112. An air passage diffuser 114 is fluidly coupled to and downstream of the air passage compressor 110. The further compressed air flow 112 exhausts into the air passage diffuser 114 and exits into the exterior 98 of the multi-fuel combustion system 30 as a desired air flow 116. The air flow 116 from the exterior 98 of the multi-fuel combustion system 30 can pass into the combustion chamber 44 as the atomizing air flow 120, the air flow 104 from the additional dilution holes indicated by arrows, the air flow 124 from the set of dilution holes 96, or any combination thereof.

Additionally, or alternatively, the air flow 116 provided to the exterior 98 of the multi-fuel combustion system 30 can be provided to the first fuel system 60 upstream of the outlet 70, the second fuel system 80 upstream of the gaseous fuel injector outlet 86, or a combination thereof.

Once fuel and compressed air are provided to the multi-fuel combustion system 30, the turbine engine 10 (FIG. 1) can then move through the different portions of the cycle of operation by increasing, decreasing, or maintaining the amount of the first fuel 58 provided to the rotary fuel slinger 62 and the amount of the second fuel 74 provided to the gaseous fuel injector 82. Additionally, or alternative, the turbine engine 10 can then move through the different portions of the cycle of operation by increasing, decreasing, or maintaining the rotational speed of one or more components.

The rotary fuel slinger 62 can be designed for maximum fuel flow and can be optimized for cruising to improve the combustion efficiency and reduce emissions from the first combustion zone 50 such as, but not limited to, nitrogen oxides ($NO_x$) emissions during a cruising portion of the cycle of operation. The cycle of operation can include, but is not limited to, start-up, idle, take-off, cruse, decent or landing, and shut-down.

During, for example, idling, when the rotary fuel slinger 62 rotates at a lower speed than during cruising, the first combustion zone 50 can have increased emissions when compared to the emissions during cruising. To reduce or eliminate the emissions from the first combustion zone 50 during start-up, idle, take-off, cruse, decent or landing, shut-down, or any combination thereof, the second fuel 74 can be provided to the gaseous fuel injector 82. The emissions from the first combustion zone 50 are exhausted to the second combustion zone 52, which, when ignited, combusts or otherwise eliminates at least a portion of the emissions from the first combustion zone 50.

The second fuel 74, being a hydrogen-based fuel, reduces the environmentally unwanted byproducts. Hydrogen or hydrogen mixed with another element has a higher flame temperature than traditional fuels. That is, hydrogen or a hydrogen mixed fuel typically has a wider flammable range and a faster burning velocity than traditional hydrocarbon-based fuels.

In a different and non-limiting example, the multi-fuel combustion system 30 can operate the turbine engine 10 using the first fuel 58, the second fuel 74, or both the first fuel 58 and second fuel 74. This allows for a variation in fuel types available at different locations globally. For example, an airport can only have the first fuel 58 or the second fuel 74 available for refueling. The turbine engine 10 (FIG. 1) can complete a cycle of operation using just the first fuel 58 or the second fuel 74.

Figure 4:
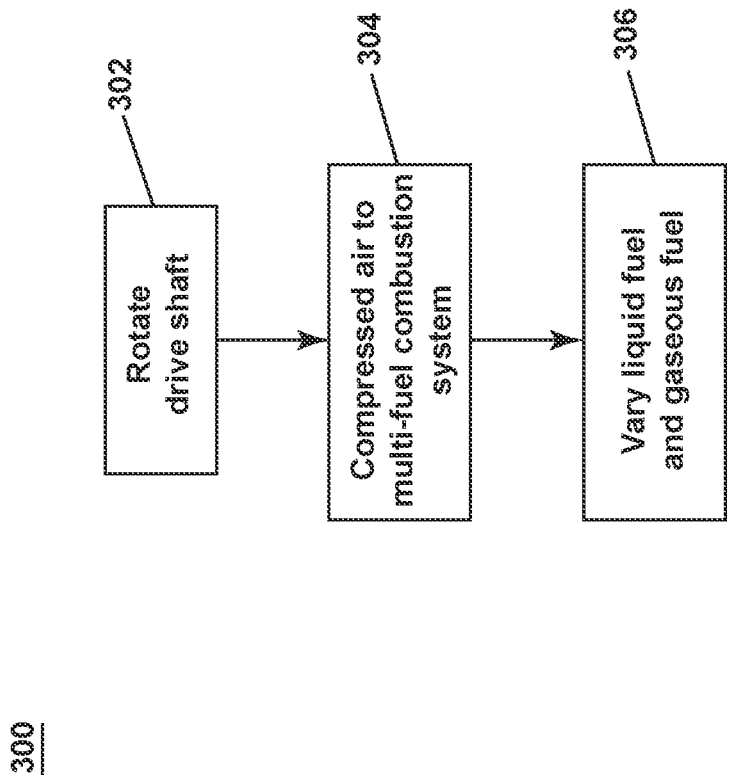
FIG. 4 is a flow chart illustrating a method of operating the turbine engine having the multi-fuel combustion system of FIG. 1 in accordance with various aspects described herein.

FIG. 4 illustrates a method 300 of operating a turbine engine 10 (FIG. 1) having a multi-fuel combustion system 30. The method 300 can include, at 302, providing mechanical energy to begin rotation of at least the drive shaft 18 and a portion of the compressor section 12 to start the turbine engine 10.

At 304, compressed air flows into the exterior 98 (FIG. 3) of the multi-fuel combustion system 30 (FIG. 3). The compressed air flow 108 from the exterior 98 of the multi-fuel combustion system 30 can pass into the combustion chamber 44 (FIG. 3).

During start-up, idle, take-off, cruise, decent or land, shut-down, or any combination thereof, the amount of the first fuel 58 (FIG. 3) provided to the rotary fuel slinger 62 (FIG. 3) and the second fuel 74 (FIG. 3) provided to the gaseous fuel injector 82 (FIG. 3) can be varied. That is, during the cycle of operation at 306 the amount of the first fuel 58 and the second fuel 74 is varied or controlled during one or more stages or between stages of the cycle of operation.

The first ignitor 78 (FIG. 3), the second ignitor 94 (FIG. 3), or a combination thereof can ignite or begin combustion of the fuel-air in the combustion chamber 44. The ignition, amount, and type of fuel delivered to create the fuel-air mixtures in the combustion chamber 44 can be controlled by a controller, such as controller 122 (FIG. 3). The controller can be in communication with the valve 88 (FIG. 3).

More specifically, during start-up or idle the second fuel 74 can be provided to the gaseous fuel injector 82 and ignited by the second ignitor 94. During take-off the first fuel 58 and the second fuel 74 can be provided to the rotary fuel slinger 62 and the gaseous fuel injector 82, respectively. Optionally, the first ignitor 78 can ignite the fuel-air mixture exiting the rotary fuel slinger 62 in the first combustion zone 50.

During cruising, the first fuel 58 can be provided to the rotary fuel slinger 62 and the amount of second fuel 74 provided to the gaseous fuel injector 82 can decrease or cease. Alternatively, in a different and non-limiting example, the amount of second fuel 74 provided to the gaseous fuel injector 82 can increase when the liquid fuel is depleted or is reduced for other reasons to maintain cruising.

During landing, the first fuel 58 and the second fuel 74 can be provided to the rotary fuel slinger 62 and the gaseous fuel injector 82, respectively. Optionally, the second ignitor 94 can restart combustion in the second combustion zone 52.

During shut-down, the first fuel 58 can decrease and cease to be provided to the rotary fuel slinger 62 and concurrently or sequentially, the second fuel 74 can decrease and cease to be provided to the gaseous fuel injector 82.

Further, the amount of the liquid fuel and the amount of gaseous fuel can vary based on external conditions, desired thrust, or a combination thereof during any portion of the operation of the turbine engine.

Figure 5:
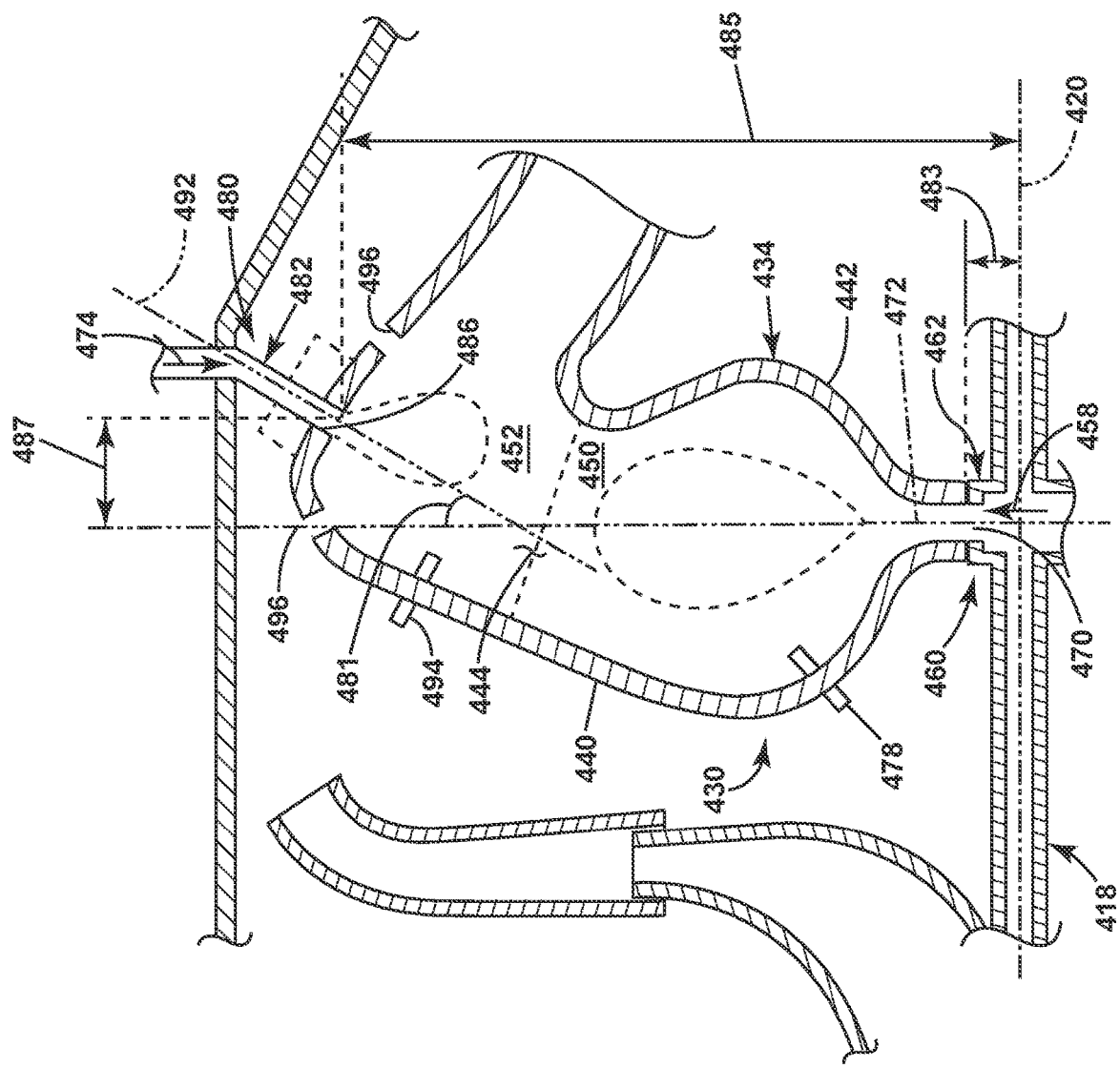
FIG. 5 is a variation of the schematic cross-sectional view of FIG. 2, in accordance with various aspects described herein.

FIG. 5 is a variation of a schematic cross-sectional view of FIG. 2, wherein FIG. 5 illustrates a multi-fuel combustion system 430, that can be used in the turbine engine 10 (FIG. 1).

The multi-fuel combustion system 430 is similar to the multi-fuel combustion system 30 (FIG. 2), therefore, like parts will be identified with like numerals increased by four hundred (400), with it being understood that the description of the like parts of the multi-fuel combustion system 30 applies to the multi-fuel combustion system 430, unless otherwise noted.

Similar to the multi-fuel combustion system 30, the multi-fuel combustion system 430 rotatably couples to a drive shaft 418 that rotates about an engine centerline 420. Further, the multi-fuel combustion system 430 includes a combustor liner 434 with a forward liner 440, an aft liner 442, a combustion chamber 444, a first combustion zone 450, a second combustion zone 452, a first fuel system 460 including a rotary fuel slinger 462 having an outlet 470 for providing a first fuel 458, a slinger injector centerline 472 defined by the outlet 470, a first ignitor 478, a second fuel system 480, a gaseous fuel injector 482 having a gaseous fuel injector outlet 486 for providing a second fuel 474, a gaseous fuel injector centerline 492 defined by the gaseous fuel injector outlet 486, a second ignitor 494, and a set of dilution holes 496.

The gaseous fuel injector centerline 492 can form an angle with the engine centerline 420 in a range from 20° to less than 85°. An angle 481 can be defined as the angle between the gaseous fuel injector centerline 492 and the slinger injector centerline 472. The angle 481 can be in a range from 0° to 90°. For example, the angle 481 can be in a range of 5° to 40°. A non-zero angle 481 can lengthen fuel-air mixing and/or help direct the exhaust from the second combustion zone 52.

A first radial distance 483 is measured radially outward from the engine centerline 420 to the outlet 470. A second radial distance 485 is measured radially outward from the engine centerline 420 to the gaseous fuel injector outlet 486. The second radial distance 485 is greater than the first radial distance 483.

The gaseous fuel injector outlet 486 can be axially aft of the outlet 470. An axial outlet distance 487 can be defined as the axial distance, measured parallel to the engine centerline 420, between the gaseous fuel injector outlet 486 and the outlet 470.

While illustrated as greater than the first radial distance 483, it is contemplated that the axial outlet distance 487 can be less than the first radial distance 483.

Locating the gaseous fuel injector outlet 486 axially aft of the outlet 470 and angling the gaseous fuel injector centerline 492 in the forward direction would allow for increase in residence time.

Figure 6:
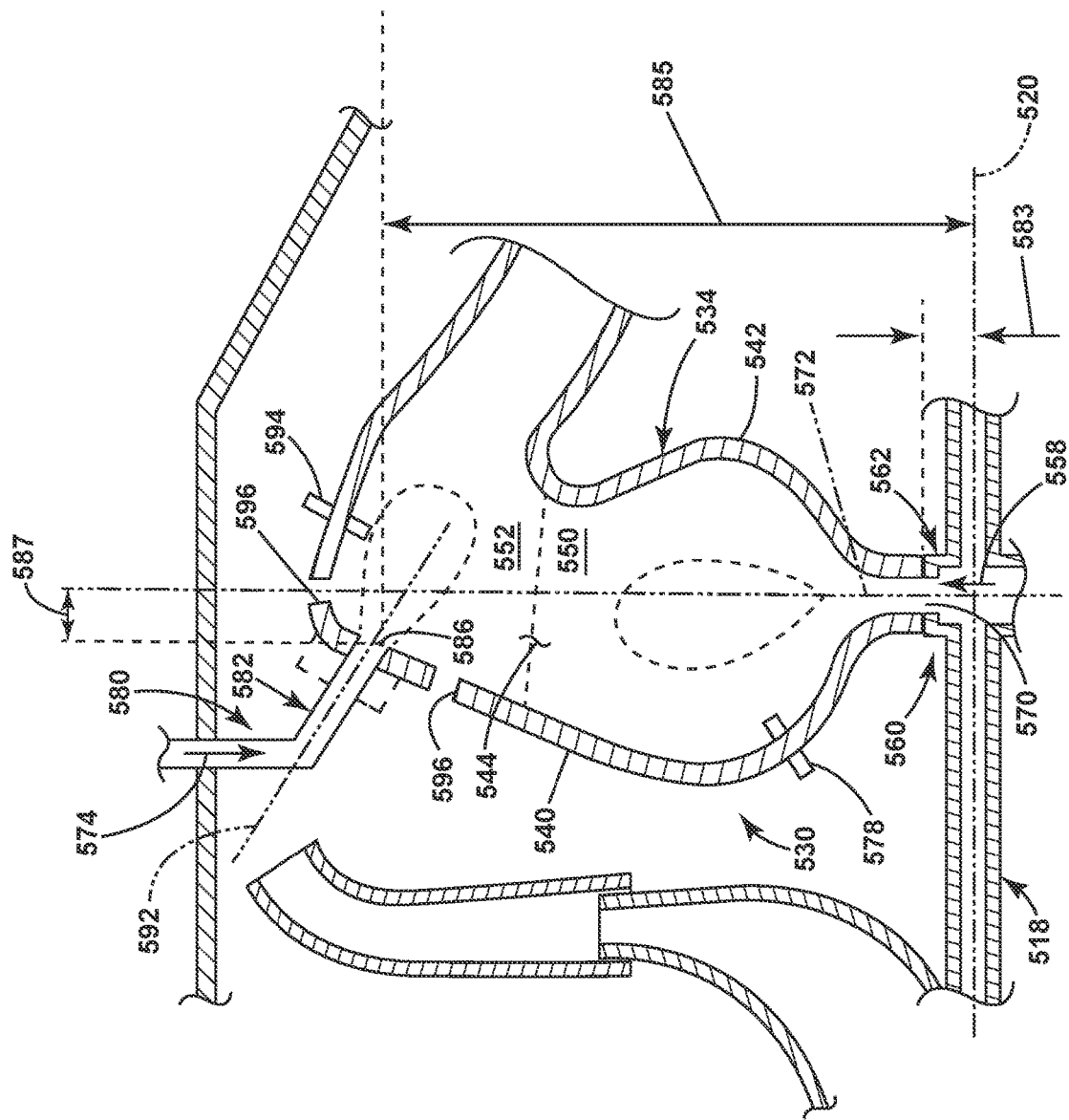
FIG. 6 is another variation of the schematic cross-sectional view of FIG. 2 and FIG. 4, in accordance with various aspects described herein.

FIG. 6 is another variation of a schematic cross-sectional view of FIG. 2, wherein FIG. 6 illustrates a multi-fuel combustion system 530, that can be used in the turbine engine 10 (FIG. 1).

The multi-fuel combustion system 530 is similar to the multi-fuel combustion system 30 (FIG. 2), 430 (FIG. 5), therefore, like parts will be identified with like numerals further increased by a hundred, with it being understood that the description of the like parts of the multi-fuel combustion system 30, 430 applies to the multi-fuel combustion system 530, unless otherwise noted.

Similar to the multi-fuel combustion system 30, 430, the multi-fuel combustion system 530 rotatably couples to a drive shaft 518 that rotates about an engine centerline 520. Further, the multi-fuel combustion system 530 includes a combustor liner 534 having a forward liner 540, an aft liner 542, a combustion chamber 544, a first combustion zone 550, a second combustion zone 552, a first fuel system 560 including a rotary fuel slinger 562 having an outlet 570 for providing a first fuel 558, a slinger injector centerline 572 defined by the outlet 570, a first ignitor 578, a second fuel system 580, a gaseous fuel injector 582 having a gaseous fuel injector outlet 586 for providing a second fuel 574, a gaseous fuel injector centerline 592 defined by the gaseous fuel injector outlet 586, a second ignitor 594, and a set of dilution holes 596.

A first radial distance 583 is measured radially outward from the engine centerline 520 to the outlet 570. A second radial distance 585 is measured radially outward from the engine centerline 520 to the gaseous fuel injector outlet 586. The second radial distance 585 is greater than the first radial distance 583.

The gaseous fuel injector outlet 586 can be axially forward of the outlet 570. An axial outlet distance 587 can be defined as the axial distance, measured parallel to the engine centerline 520, between the gaseous fuel injector outlet 586 and the outlet 570.

The axial outlet distance 587, while illustrated as less than the first radial distance 583, it is contemplated that the axial outlet distance 587 can be greater than the first radial distance 583.

Locating the gaseous fuel injector outlet 586 axially forward of the outlet 570 and angling the gaseous fuel injector centerline 592 in the forward direction would allow for increase in residence time.

Benefits of aspects described herein provide a multi-fuel combustion system disclose a combustor that operates utilizing liquid or traditional fuels, gaseous fuel, such as hydrogen, other sustainable aviation fuels, or any combination thereof.

Additional benefits of the multi-fuel combustion system include improved emissions. The multi-fuel combustion system includes a slinger combustor where the liquid fuel or first fuel is provided to a first combustion zone using a rotary fuel slinger. The rotary fuel slinger can be designed for maximum fuel flow and can be optimized for cruising to improve the combustion efficiency and reduce emissions from the first combustion zone.

The multi-fuel combustion system further includes a gaseous fuel injector providing the gaseous fuel or the second fuel to a second combustion zone. The gaseous fuel or the second fuel burns cleaner than the liquid fuel or the second fuel.

When operating using both fuels, the second combustion zone receives the emissions of the first combustion zone. The second combustion zone then combusts the emissions from the first combustion zone using a faster, hotter, and cleaner burning fuel. This results in the total emissions from the multi-fuel combustion system being reduced.

Gaseous fuel, including hydrogen, spreads/disperses at a faster rate than atomized liquid fuel, which can involve less mixing time for the gaseous fuel and the flame from the gaseous fuel may be more likely to spread farther and faster, which can increase the risk of flashback and increase the impact of controlling the flame and limiting flame spread by controlling the dispersion of the gaseous fuel.

Gaseous fuel may not be provided at every airport. Similarly, traditional fuels or liquid fuels may not be provided at every airport. As long as the aircraft can be provided with a predetermined amount of the first fuel (liquid fuel) or the second fuel (hydrogen-based fuel), a cycle of operation can be completed.

Dilution holes adjacent the gaseous fuel injector help contain gaseous fuel-air mixtures that have lower densities and higher velocities than liquid fuels. For example, flame shaping formations, such as the set of dilution holes, can contain the gaseous fuel-air mixtures such that the flame velocity matches the flow velocity to provide a stable flame.

Further aspects are provided by the subject matter of the following clauses:

A multi-fuel combustion system for a turbine engine, the multi-fuel combustion system comprising a combustion chamber formed by a combustor liner, the combustion chamber defining a first combustion zone and a second combustion zone, a first fuel system fluidly coupled with the first combustion zone, wherein the first fuel system includes a rotary fuel slinger for providing a first fuel to the first combustion zone, and a second fuel system fluidly coupled with the second combustion zone, wherein the second fuel system includes a gaseous fuel injector for providing a second fuel to the second combustion zone, wherein the second fuel is a gaseous fuel.

A multi-fuel combustion system for a turbine engine, the multi-fuel combustion system comprising a combustion chamber formed by a combustor liner, the combustion chamber defining a first combustion zone and a second combustion zone, a first fuel system fluidly coupled with the first combustion zone, wherein the first fuel system includes a rotary fuel slinger for providing a first fuel to the first combustion zone, and a second fuel system fluidly coupled with the second combustion zone, wherein the second fuel system includes a fuel injector for providing a second fuel to the second combustion zone, wherein the second fuel is a hydrogen-based fuel.

The multi-fuel combustion system of any preceding clause, wherein the rotary fuel slinger includes an outlet a first radial distance from an engine centerline and the gaseous fuel injector includes an outlet at a second radial distance from the engine centerline, wherein the first radial distance is less than the second radial distance.

The multi-fuel combustion system of any preceding clause, wherein the first fuel has a residence time in a range from 3 milliseconds to 5 milliseconds.

The multi-fuel combustion system of any preceding clause, wherein the first fuel includes kerosene or petroleum.

The multi-fuel combustion system of any preceding clause, wherein the second fuel has a residence time in a range from 1 millisecond to 3 milliseconds.

The multi-fuel combustion system of any preceding clause, wherein the second fuel includes hydrogen.

The multi-fuel combustion system of any preceding clause, wherein the second combustion zone is fluidly downstream of the first combustion zone, and wherein the gaseous fuel injector is axially aft of the rotary fuel slinger.

The multi-fuel combustion system of any preceding clause, wherein the second fuel system is fluidly downstream of the first fuel system, and wherein the gaseous fuel injector is axially forward of the rotary fuel slinger.

The multi-fuel combustion system of any preceding clause, wherein the second fuel system is fluidly downstream of the first fuel system, and wherein a portion of the gaseous fuel injector is axially aligned with at least a portion of a slinger injector centerline.

The multi-fuel combustion system of any preceding clause, wherein the gaseous fuel injector is a set of circumferentially spaced gaseous fuel injectors.

The multi-fuel combustion system of any preceding clause, wherein the rotary fuel slinger includes an outlet defining a slinger injector centerline and the gaseous fuel injector includes an outlet defining a gaseous fuel injector centerline, wherein an angle measured between the slinger injector centerline and the gaseous fuel injector centerline is in a range from 5° to 40°.

The multi-fuel combustion system of any preceding clause, wherein an angle measured between the slinger injector centerline and an engine centerline is in a range from 85° to 95°.

The multi-fuel combustion system of any preceding clause, further comprising a set of dilution holes located adjacent an outlet of the gaseous fuel injector.

The multi-fuel combustion system of any preceding clause, wherein the combustion chamber is an annular chamber.

The multi-fuel combustion system of any preceding clause, further comprising a gaseous fuel supply passage fluidly coupled to the gaseous fuel injector.

The multi-fuel combustion system of any preceding clause, wherein a turbine engine includes a compressor section, a combustion section, and a turbine section in a serial flow arrangement, wherein the multi-fuel combustion system is located in the combustion section of the turbine engine.

The multi-fuel combustion of any preceding clause, wherein a turbine engine comprises a drive shaft rotationally coupled to the compressor section and turbine section, and wherein the drive shaft defines an engine centerline for the turbine engine.

The multi-fuel combustion of any preceding clause, further comprising a fuel passage defined by a portion of the drive shaft, wherein the fuel passage is fluidly coupled to the rotary fuel slinger.

The multi-fuel combustion system of any preceding clause, wherein an angle measured between the slinger injector centerline and an engine centerline is in a range from 20° to less than 85°.

A slinger multi-fuel combustion system for a turbine engine comprising a compressor section, combustion section, and turbine section in a serial flow arrangement and a drive shaft coupled to one or more portions of the compressor section or the turbine section, the drive shaft defining an engine centerline, the slinger multi-fuel combustion system comprising a combustion chamber having a radially-extending portion and an axially-extending portion, a liquid fuel injector having a slinger operably coupled to the drive shaft and having an outlet emitting atomized liquid fuel into the radially-extending portion of the combustion chamber using centrifugal force from rotation of the drive shaft, and a gaseous fuel injector having a gaseous fuel injector outlet emitting gaseous fuel into the combustion chamber downstream of the outlet.

The slinger multi-fuel combustion system of any preceding clause, further comprising a fuel passage defined by a portion of the drive shaft, wherein the fuel passage is fluidly coupled to the liquid fuel injector.

The slinger multi-fuel combustion system of any preceding clause, further comprising a gaseous fuel supply passage fluidly coupled to the gaseous fuel injector, wherein a valve controls flow of the gaseous fuel into the gaseous fuel injector.

The slinger multi-fuel combustion system of any preceding clause, further comprising a set of dilution holes located adjacent an outlet of the gaseous fuel injector, wherein a dilution hole centerline is defined by a dilution hole of the set of dilution holes, and wherein the dilution hole centerline forms a non-zero angle with a gaseous fuel injector centerline defined by the gaseous fuel injector outlet.

The slinger multi-fuel combustion system of any preceding clause, wherein the liquid fuel injector includes an outlet defining a slinger injector centerline and the gaseous fuel injector includes an outlet defining a gaseous fuel injector centerline, wherein an angle measured between the slinger injector centerline and the gaseous fuel injector centerline is in a range from 5° to 40°, and wherein an angle measured between the slinger injector centerline and the engine centerline is in a range from 85° to 95°.

A method of operating a turbine engine comprising a compressor section, combustion section having a multi-fuel combustion system, and turbine section is serial flow arrangement and a drive shaft coupled to one or more portions of the compressor section or the turbine section, the drive shaft defining an engine centerline, the method comprising rotating at least the drive shaft and a portion of the combustion section to start the turbine engine, flowing compressed air from the compressor section to an exterior of the multi-fuel combustion system, flowing a portion of the compressed air from the exterior of the multi-fuel combustion system into a combustion chamber defined by a combustor liner of the multi-fuel combustion system, varying an amount of a liquid fuel provided to a first combustion zone of the combustion chamber, wherein the liquid fuel is provided by a rotary fuel slinger, and varying an amount of a gaseous fuel provided to a second combustion zone of the combustion chamber, wherein the gaseous fuel is provided by a gaseous fuel injector downstream of the rotary fuel slinger.

The method of any previous clause further comprising igniting, with a first ignitor or a second ignitor, a fuel-air mixture in the combustion chamber.

The method of any previous clause wherein the varying the amount of the liquid fuel and the varying the amount of the gaseous fuel includes providing both the liquid fuel and the gaseous fuel at take-off.

The method of any previous clause wherein the varying the amount of the gaseous fuel includes reducing or ceasing the gaseous fuel during cruising.

The method of any previous clause wherein the varying the amount of the liquid fuel and the varying the amount of the gaseous fuel includes providing both the liquid fuel and the gaseous fuel at landing.

The method of any previous clause further comprising restarting combustion via the second combustion zone during landing.

While described with respect to a turbine engine, it should be appreciated that the combustor as described herein can be for any engine with a having a combustor. It should be appreciated that application of aspects of the disclosure discussed herein are applicable to engines with propeller sections or fan and booster sections along with turbojets, turbo engines, and turboshaft engines in aviation, marine, and stationary applications as well.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A multi-fuel combustion system for a turbine engine, the multi-fuel combustion system comprising:
   a combustion chamber formed by a combustor liner, the combustion chamber defining a first combustion zone and a second combustion zone;
   a first fuel system fluidly coupled with the first combustion zone, wherein the first fuel system includes a rotary fuel slinger for providing a first fuel to the first combustion zone; and a second fuel system fluidly coupled with the second combustion zone, wherein the second fuel system includes a gaseous fuel injector for providing a second fuel to the second combustion zone, wherein the second fuel is a gaseous hydrogen fuel;
a first ignitor extending through the combustor liner into the first combustion zone to ignite the first fuel; and
a second ignitor extending through the combustor liner into the second combustion zone.

2. The multi-fuel combustion system of claim 1, wherein the rotary fuel slinger includes an outlet at a first radial distance from an engine centerline and the gaseous fuel injector includes an outlet at a second radial distance from the engine centerline, wherein the first radial distance is less than the second radial distance.

3. The multi-fuel combustion system of claim 1, wherein the first fuel has a residence time in a range from 3 milliseconds to 5 milliseconds.

4. The multi-fuel combustion system of claim 3, wherein the first fuel includes kerosene or petroleum.

5. The multi-fuel combustion system of claim 3, wherein the second fuel has a residence time in a range from 1 millisecond to 3 milliseconds.

6. The multi-fuel combustion system of claim 1, wherein the second combustion zone is fluidly downstream of the first combustion zone;
wherein the second combustion zone combusts the second fuel at a higher temperature than the first combustion zone combusts the first fuel such that combustion of the second fuel in the second combustion zone eliminates at least a portion of emissions from combustion of the first fuel in the first combustion zone to reduce total emissions from the multi-fuel combustion system, and wherein the gaseous fuel injector is axially aft of the rotary fuel slinger.

7. The multi-fuel combustion system of claim 6, wherein the second combustion zone combusts the second fuel faster and hotter than the first combustion zone combusts the first fuel.

8. The multi-fuel combustion system of claim 1, wherein the second fuel system is fluidly downstream of the first fuel system such that combustion of the second fuel in the second combustion zone eliminates at least a portion of emissions from combustion of the first fuel in the first combustion zone to reduce total emissions from the multi-fuel combustion system, and wherein the gaseous fuel injector is axially forward of the rotary fuel slinger.

9. The multi-fuel combustion system of claim 1, wherein the second fuel system is fluidly downstream of the first fuel system, and wherein a portion of the gaseous fuel injector is axially aligned with at least a portion of a slinger injector centerline.

10. The multi-fuel combustion system of claim 1, wherein the gaseous fuel injector is a set of circumferentially spaced gaseous fuel injectors.

11. The multi-fuel combustion system of claim 1, wherein the rotary fuel slinger includes an outlet defining a slinger injector centerline and the gaseous fuel injector includes an outlet defining a gaseous fuel injector centerline, wherein an angle measured between the slinger injector centerline and the gaseous fuel injector centerline is in a range from 5° to 40°.

12. The multi-fuel combustion system of claim 11, wherein an angle measured between the slinger injector centerline and an engine centerline is in a range from 85° to 95°.

13. The multi-fuel combustion system of claim 1, further comprising a set of dilution holes located adjacent an outlet of the gaseous fuel injector.

14. A slinger multi-fuel combustion system for a turbine engine comprising a compressor section, combustion section, and turbine section in a serial flow arrangement and a drive shaft coupled to one or more portions of the compressor section or the turbine section, the drive shaft defining an engine centerline, the slinger multi-fuel combustion system comprising:
a combustion chamber having a radially-extending portion and an axially-extending portion;
a liquid fuel injector having a slinger operably coupled to the drive shaft and having an outlet for emitting atomized liquid fuel into the radially-extending portion of the combustion chamber using centrifugal force from rotation of the drive shaft;
a gaseous fuel injector having a gaseous fuel injector outlet for emitting gaseous hydrogen fuel into the combustion chamber downstream of the outlet of the liquid fuel injector such that combustion of the gaseous hydrogen fuel eliminates at least a portion of emissions from combustion of the atomized liquid fuel to reduce total emissions from the slinger multi-fuel combustion system; and
a first ignitor and a second ignitor;
wherein the combustion chamber is defined by a combustor liner;
wherein the combustion chamber defines a first combustion zone and a second combustion zone downstream of the first combustion zone;
wherein the liquid fuel injector is fluidly coupled with the first combustion zone;
wherein the first ignitor extends through the combustor liner into the first combustion zone to ignite the atomized liquid fuel in the first combustion zone;
wherein the gaseous fuel injector is fluidly coupled with the second combustion zone;
wherein the second ignitor extends through the combustor liner into the second combustions zone to ignite the gaseous hydrogen fuel in the second combustion zone to eliminate at least the portion of the emissions from combustion of the atomized liquid fuel in the first combustion zone.

15. The slinger multi-fuel combustion system of claim 14, further comprising a fuel passage defined by a portion of the drive shaft, wherein the fuel passage is fluidly coupled to the liquid fuel injector.

16. The slinger multi-fuel combustion system of claim 15, further comprising a gaseous fuel supply passage fluidly coupled to the gaseous fuel injector, wherein a valve controls flow of the gaseous hydrogen fuel into the gaseous fuel injector.

17. The slinger multi-fuel combustion system of claim 14, further comprising a set of dilution holes located adjacent an outlet of the gaseous fuel injector, wherein a dilution hole centerline is defined by a dilution hole of the set of dilution holes, and wherein the dilution hole centerline forms a non-zero angle with a gaseous fuel injector centerline defined by the gaseous fuel injector outlet.

18. The slinger multi-fuel combustion system of claim 14, wherein the liquid fuel injector includes an outlet defining a slinger injector centerline and the gaseous fuel injector includes an outlet defining a gaseous fuel injector centerline, wherein an angle measured between the slinger injector centerline and the gaseous fuel injector centerline is in a range from 5° to 40°, and wherein an angle measured between the slinger injector centerline and the engine centerline is in a range from 85° to 95°.

* * * * *